(12) United States Patent
Wen et al.

(10) Patent No.: US 11,188,245 B2
(45) Date of Patent: Nov. 30, 2021

(54) DATA STORAGE DEVICE, SYSTEM, AND DATA WRITING METHOD

(71) Applicant: INNOGRIT TECHNOLOGIES CO., LTD., Shanghai (CN)

(72) Inventors: Hui Wen, Shanghai (CN); Qun Zhao, Shanghai (CN); Qian Cheng, Shanghai (CN); Ying Chu, Shanghai (CN); Cheng-Yun Hsu, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 98 days.

(21) Appl. No.: 16/746,842

(22) Filed: Jan. 18, 2020

(65) Prior Publication Data

US 2020/0264789 A1 Aug. 20, 2020

(30) Foreign Application Priority Data

Feb. 14, 2019 (CN) .......................... 201910114383.8

(51) Int. Cl.
*G06F 12/00* (2006.01)
*G06F 3/06* (2006.01)

(52) U.S. Cl.
CPC ............ *G06F 3/0634* (2013.01); *G06F 3/061* (2013.01); *G06F 3/0604* (2013.01); *G06F 3/064* (2013.01);
(Continued)

(58) Field of Classification Search
CPC ...... G06F 3/0634; G06F 3/0604; G06F 3/064; G06F 3/0659; G06F 3/0673; G06F 3/061;
(Continued)

(56) References Cited

U.S. PATENT DOCUMENTS

| 2014/0379968 A1* | 12/2014 | Yao | G06F 3/0604 |
| | | | 711/103 |
| 2016/0364337 A1* | 12/2016 | Hale | G06F 12/0871 |

(Continued)

FOREIGN PATENT DOCUMENTS

| CN | 101656104 | 7/2010 |
| CN | 103688247 A | 3/2014 |

(Continued)

*Primary Examiner* — John A Lane
(74) *Attorney, Agent, or Firm* — Womble Bond Dickinson (US) LLP

(57) ABSTRACT

The present disclosure relates to a data storage device, system, and a data writing method. The device comprises a controller and a plurality of storage blocks, each storage block consisting of an idle storage block and a non-idle storage block, the controller connecting to each storage block respectively, wherein the controller is configured to generate, when receiving a data writing command, a self-adapting adjustment instruction according to a comparison between a storage distribution state of the storage block and a first threshold value to configure the idle-storage block as an SLC block or an XLC block; the storage block is configured to correspondingly adjust the storage distribution state according to the self-adapting adjustment instruction to store written data in the SLC block or the XLC block of the idle storage block. By dynamically configuring the storage blocks as an SLC block or an XLC block according to the storage distribution state, the data storage device, system, and the data writing method according to the embodiments of the present disclosure is capable of maintaining the reading/writing performance of the storage device for a relatively long period.

19 Claims, 6 Drawing Sheets

(52) U.S. Cl.
CPC .......... *G06F 3/0614* (2013.01); *G06F 3/0629* (2013.01); *G06F 3/0647* (2013.01); *G06F 3/0659* (2013.01); *G06F 3/0673* (2013.01); *G06F 3/0679* (2013.01)

(58) Field of Classification Search
CPC .... G06F 3/0679; G06F 3/0647; G06F 3/0629; G06F 3/0614
See application file for complete search history.

(56) References Cited

U.S. PATENT DOCUMENTS

2018/0081543 A1    3/2018   Muchherla et al.
2018/0285258 A1*  10/2018   Muchherla .......... G06F 12/0246
2019/0369899 A1*  12/2019   Tanpairoj ............ G06F 12/0253

FOREIGN PATENT DOCUMENTS

| CN | 104932830 A | 9/2015 |
| CN | 107845394 A | 3/2018 |

\* cited by examiner

DATA STORAGE DEVICE, SYSTEM, AND DATA WRITING METHOD

CROSS-REFERENCE TO RELATED APPLICATION

The present application is based upon and claims the benefit of a priority of Chinese Patent Application No. 201910114383.8, filed on Feb. 14, 2019, the entire contents of which are incorporated herein by reference.

TECHNICAL FIELD

The present disclosure relates to computing technology, in particular a data storage device, system, and a data writing method.

BACKGROUND

SSD (Solid State Disk) is increasingly applied to the daily life of people because of its relatively good performance. At present, the storage medium used in mainstream SSDs is NAND flash. Data of NAND flash is stored in a storage cell in bits. According to the amount of bits stored in each storage cell, the storage cells may be divided into single-level cell (SLC), Multi-Level Cell (MLC), Quad-Level Cell (QLC), and X-Level Cell (XLC). The reading/writing speed is inversely related to the capacity of the storage cell. Therefore, the SLC has the smallest capacity, but the highest reading/writing speed and reliability.

Most of current SSDs use NAND flash of XLC as the storage medium. In order to improve the reading/writing performance of SSD, a portion of the fixed blocks of the XLC mode are switched to the SLC mode. When the SSD receives data written by a host, the data is first written into the SLC block. After all SLC blocks are filled up, the data in the SLC blocks need to be transferred to the XLC blocks.

In such a method, although improves the reading/writing performance of the SSD to some extent, since there are only a few SLC blocks, data in the SLC blocks needs to be transferred to the XLC blocks after all the SLC blocks are filled up. Thus, the high performance can only be remained for a relatively short period. When the procedure of transfer from the SLC blocks to the XLC, the reading/writing performance of the SSD will reduce.

SUMMARY

In view of the above, the present disclosure proposes a data storage device, a system, and a data writing method, which maintains a high reading/writing performance of the storage device for a relatively long period.

According to one aspect of the present disclosure, there is provided a data storage device, comprising a controller and a plurality of storage blocks each of which consists an idle storage block and a non-idle storage block. The controller is connected to each of the storage blocks. The controller is configured for, according to a comparison between the storage distribution state of the storage blocks and a first threshold value, generating a self-adapting adjustment instruction when receiving a data writing command, so as to configure the idle storage block as an SLC block or an XLC block. The storage block is configured to adjust the storage distribution state according to the self-adapting adjustment instruction, so as to store the written data in the SLC block or the XLC block of the idle storage block.

In a possible embodiment, the non-idle storage block comprises a non-idle SLC block and a non-idle XLC block.

In a possible embodiment, the controller is configured to receive a data writing command; retrieve the storage distribution state; compare a retrieved result with the first threshold value; when the amount of the non-idle SLC block is less than the first threshold value, select and configure one idle storage block as an SLC block; when the amount of the non-idle SLC block is not less than the first threshold value, select and configure an idle storage block as an XLC block.

In a possible embodiment, the first threshold value is not greater than 1/N of a capacity of the data storage device, wherein N is an amount of bits of data stored in the XLC block.

In a possible embodiment, the controller is further configured to control the storage block to perform data transfer when the amount of the idle storage block is smaller than a second threshold value.

In a possible embodiment, controlling the storage block to perform data transfer comprises: selecting and configuring an idle storage block as an XLC block serving as a target block; selecting a non-idle SLC block as a data source block, and transferring data in the data source block to the target block; releasing the data source block, the released data source block serving as an idle storage block.

In a possible embodiment, selecting a non-idle SLC block as a data source block, and transferring data in the data source block to the target block comprises: selecting a non-idle SLC block having a least amount of valid data as the data source block, transferring the valid data in the data source block to the target block by garbage collection (GC); or selecting a non-idle SLC block having a most amount of valid data as the data source block, transferring all data in the data source block to the target block by COPYBACK.

According to a second aspect of the present disclosure, there is provided a data writing method applicable for a data storage device, comprising: receiving a data writing command; retrieving a storage distribution state of storage blocks; according to a comparison between a retrieved result and a first threshold value, configuring an idle storage block as SLC block or XLC block; writing data in the SLC block or the XLC block in the idle storage block.

In a possible embodiment, according to a comparison between a retrieved result and a first threshold value, configuring an idle storage block as SLC block or XLC block; writing data in the SLC block or the XLC block in the idle storage block comprises: selecting and configuring an idle storage block as SLC block when the amount of non-idle SLC block in the storage block is smaller than a first threshold value; selecting and configuring an idle storage block as XLC block when the amount of non-idle SLC block in the storage block is not smaller than the first threshold value.

In a possible embodiment, the first threshold value is not greater than 1/N of a capacity of the data storage device, wherein N is an amount of bits of data stored in the XLC block.

In a possible embodiment, the method further comprises: controlling the storage block to perform data transfer when an amount of the idle storage block is smaller than a second threshold value.

In a possible embodiment, controlling the storage block to perform data transfer comprises: selecting and configuring an idle storage block as XLC block serving as a target block; selecting a non-idle SLC block as a data source block, transferring data in the data source block to the target block;

releasing the data source block, the released source block serving as an idle storage block.

In a possible embodiment, selecting and configuring a non-idle SLC block as a data source block, transferring data in the data source block to the target block comprises: selecting a non-idle SLC block having a least amount of valid data as the data source block, transferring the valid data in the data source block to the target block by GC; or selecting a non-idle SLC block having a most amount of valid data as the data source block, transferring all data in the data source block to the target block by COPYBACK.

According to a third aspect of the present disclosure, there is provided a data storage system, comprising a data storage device according to the first aspect of the present disclosure, a data writing device configured to write data into the data storage device.

By generating a self-adapting adjustment instruction according to a comparison between the storage distribution state of the storage block and the first threshold value, so as to configuring the idle storage block as SLC block or XLC block, and storing the written data in the configured SLC block or XLC block, the data storage device, system and data writing method according to the embodiments of various aspects of the present disclosure is capable of delaying the time point of transferring data within the data storage device by dynamically adjusting the amount of SLC blocks, so as to extend the period of high reading/writing performance of the data storage device.

Other features and aspects of the present disclosure will become clear according to the following detailed description of the exemplary embodiments with reference to the drawings.

BRIEF DESCRIPTION OF THE DRAWINGS

The drawings, which are incorporated in and constitute part of the specification, together with the description, illustrate exemplary examples, features and aspects of the present disclosure and serve to explain the principles of the present disclosure.

DETAILED DESCRIPTION

Figure 1:
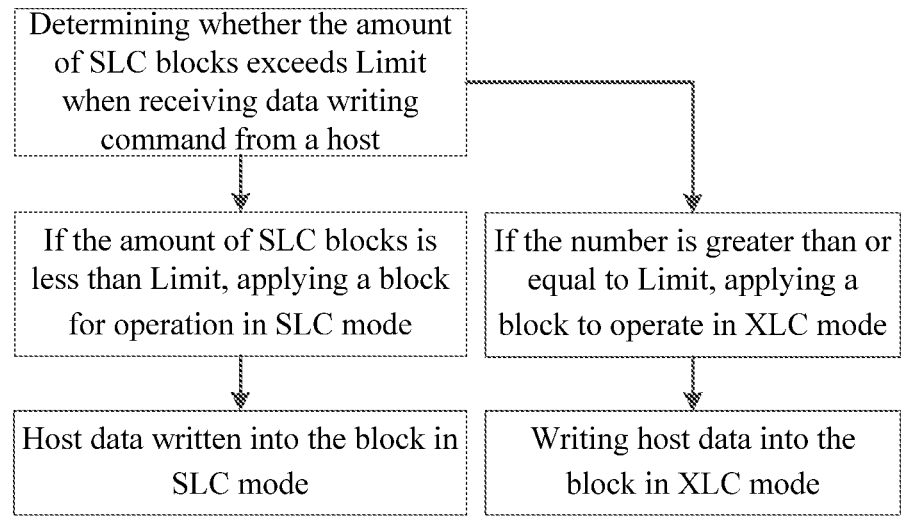
FIG. 1 is a schematic diagram of an application example of the present disclosure.

It must be noted that as used herein and in the appended claims, the singular forms "a", "an", and "the" include plural referents unless the context clearly dictates otherwise. Thus, for example, reference to "a peptide" includes a plurality of peptides.

Various exemplary examples, features and aspects of the present disclosure will be described in detail with reference to the drawings. The same reference numerals in the drawings represent parts having the same or similar functions. Although various aspects of the examples are shown in the drawings, it is unnecessary to proportionally draw the drawings unless otherwise specified.

Herein the term "exemplary" means "used as an instance or example, or explanatory". An "exemplary" example given here is not necessarily construed as being superior to or better than other examples.

Numerous details are given in the following examples for the purpose of better explaining the present disclosure. It should be understood by a person skilled in the art that the present disclosure can still be realized even without some of those details. In some of the examples, methods, means, units and circuits that are well known to a person skilled in the art are not described in detail so that the principle of the present disclosure become apparent.

SSD is a data storage apparatus with a solid-state electronic storage chip array as the storage medium, the chips being controlled for data reading/writing and storage medium management. As SSD has the characteristics of rapid reading/writing speed, low energy consumption, free of noise, good shock resistance, etc., it is widely applied in the fields including consumer electronics, data center, military, car kit, etc. and tends to replace hard disk drives.

NAND flash, as a storage medium used by mainstream SSD, stores data in form of bits in storage cells. According to the amount of bits stored in each storage cell, NAND flash may be an SLC, a MLC, a QLC, or an XLC. SLC stores 1 bit of data in each storage cell. MLC stores 2 bits of data in each storage cell. QLC stores 4 bits of data in each storage cell. SLC though has the smallest capacity, enjoys the highest reading/writing speed and the highest reliability. QLC has the greatest capacity, but has the lowest reading/writing speed and reliability. MLC has moderate capacity, reading/writing speed and reliability.

Current SSDs mainly use a NAND flash of XLC as the storage medium. XLC stores X bits of data in each storage cell. X can be 2, 3, 4, 5, 6, and so on. Since XLC block performs poorer than SLC block in wiping time and the reading/writing time, in order to improve the reading/writing performance of SSD, a portion of the fixed blocks of the XLC mode are switched to the SLC mode. When the SSD receives a data writing command, the data is first written into the SLC block. After all SLC blocks are filled up, the data in the SLC blocks need to be transferred to the XLC block.

Since the amount of SLC blocks is relatively small, when all the SLC blocks are filled up, data in the SLC blocks need to be transferred to the XLC blocks; and it is only possible to continue to write the host data into the SLC blocks when new SLC blocks are released. Thus, the high performance can only be maintained for a relatively short period by this method. When the process of transfer from the SLC blocks to the XLC blocks is initiated, the reading/writing performance of the SSD will become lower.

In order to solve the above problem, the present embodiment provides an application example of a data storage device. In the present embodiment, the amount of SLC blocks in the data storage device is a dynamic value and is self-adapted between 0 and Limit according to various states of the SSD, wherein Limit is a maximum value of the amount of SLC blocks. In the present embodiment, Limit is set to be 1/X of the capacity of SSD, X being amount of bits contained in each XLC block of the current SSD.

FIG. 1 is a schematic diagram of an application example of the present disclosure. As shown in FIG. 1, the data writing process of the data storage device in this example is as follows. When the data storage device receives a data writing command transmitted from the host, the data storage device detects whether the amount of the storage block serving as SLC block in the device exceeds the Limit. If the amount of the storage block serving as SLC block is smaller than Limit, one of the storage blocks may be selected to serve in the SLC mode, i.e., selecting one of the storage blocks as an SLC block, and writing the host data in the selected SLC block; if the amount of the storage block serving as SLC block is greater than or equal to Limit, one of the storage blocks may be selected to serve in the XLC mode, i.e., selecting one of the storage blocks as an XLC block, and writing the host data in the selected XLC block. When the amount of available storage block which is available for data storage is less than a preset value, data transfer may be initiated, i.e., data on the SLC blocks is to be transferred to idle XLC blocks.

Figure 2:
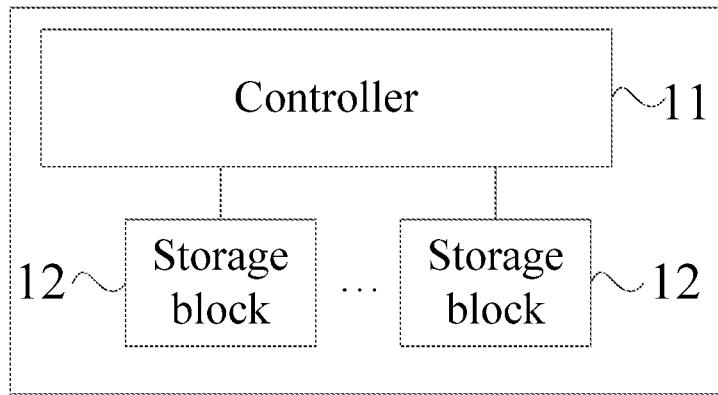
FIG. 2 is a block diagram of the data storage device according to an embodiment of the present disclosure.

FIG. 2 is a block diagram of the data storage device according to an embodiment of the present disclosure. As shown in FIG. 2, the device comprises a controller 11 and a plurality of storage blocks 12, each storage block comprising an idle storage block and a non-idle storage block, the controller being connected to each of the storage block respectively, wherein the controller is configured to generate, according to a comparison between the storage distribution state of the storage block and the first threshold value, a self-adapting adjustment instruction when receiving a data writing command to configure an idle storage block as an SLC block or an XLC block; and the storage block is configured to adjust the storage distribution state according to the self-adapting adjustment instruction to store the written data in an SLC block or XLC block of the idle storage block.

Each storage block may be an idle storage block or a non-idle storage block according to data writing situation. An idle storage block is an available storage block; it means a storage block no data has been written during the data writing process, or a storage block into which data has been written and can continue to be written. A non-idle storage block refers to an unavailable storage block and means a storage block that has been filled with data or a storage block which is not filled with data but cannot continue to be written. In addition to the hardware limitation, the amount of data that can be written into the storage block is configurable by the controller. In an example, if the idle storage block is configured as an SLC block, when the configured idle storage block receives the written data, each storage block is capable of storing 1 bit of data. In an example, if the idle storage block is configured as an XLC block, when the configured idle storage block receives the written data, each storage block is capable of storing X bits of data. X is set according to the actual situation of the storage device, which is not specifically defined here, and may be 2, 3, 4, 5, 6, and so on. After the idle storage block is configured by the controller, the written data is stored in a corresponding mode according to the configuration.

In a possible embodiment, the non-idle storage block may include a non-idle SLC block and a non-idle XLC block. The embodiment of the non-idle SLC block is not limited. In one example, the non-idle SLC block may be a storage block which is configured as an SLC block by the controller and of which the internal storage space is filled up with the written data. In one example, the non-idle SLC block may be an SLC block configured by the controller and has been filled up with data before the data writing command is received. Data in the present embodiment may be valid data or non-valid data or a mixture thereof. Similarly, the embodiment of the non-idle XLC block is not limited. In one example, the non-idle XLC block may be a storage block that is configured by the controller as an XLC block and whose internal storage space is filled up with the written data; in one example, the non-idle XLC block It can refer to the storage block that is configured as an XLC block by the controller and that has been filled with data before the data writing command is received. The data in this example may be valid data or non-valid data, or a mixture thereof.

In a possible embodiment, the controller is configured to receive a data writing command; retrieve a storage distribution state; compare the retrieved result with the first threshold value; select and configure an idle storage block as SLC block when the amount of non-idle SLC blocks is smaller than the first threshold; select and configure an idle storage block as XLC block when the amount of non-idle SLC blocks is not smaller than the first threshold.

The controller may determine, according to the storage distribution state, whether the block to be written as an SLC block or an XLC block when receiving the data writing command. The storage distribution state is mainly configured to indicate a storage state inside the storage block, which may include various aspects, e.g., the amount and the proportion of the non-idle storage blocks and the idle storage blocks, respectively, and other specific situations, for example, the amount of non-idle SLC blocks, the amount of non-idle XLC blocks, the amount of remaining idle storage blocks, and the proportions of each. In one example, according to the relationship between the amount of non-idle SLC blocks in the storage distribution state and the first threshold, it can be determined whether the block to be written is an SLC block or an XLC block. When the amount of non-idle SLC blocks is smaller than the first threshold value, it means that the current capacity of the storage device is capable of maintaining a relatively high reading/writing performance. Thus, the block to be written can be configured as an SLC block. When the amount of non-idle SLC blocks is greater than or equal to the first threshold value, it means that the current capacity of the storage device is insufficient for maintaining a relatively high reading/writing performance. Thus, the block to be written can be configured as an XLC block. By this process, the amount of SLC blocks is self-adapted between 0 and the first threshold value according to various states of the storage device during the data writing process of the storage device. Since the speed of data writing is relatively high when performed by an SLC block, the period of high-performance reading/writing of the storage device is extended by the self-adapting of the amount of the SLC blocks, thereby improving the reading/writing performance of the storage device.

The specific value of the first threshold value may be flexibly configured according to the actual situation of the storage device and is not limited. In a possible embodiment, the first threshold value is not greater than 1/N of the capacity of the data storage device, wherein N is an amount of bits stored in the XLC block. In an example, the XLC blocks in the storage device may be TLCs (Trinary-Level Cell), each of which stores 3 bits of data. Thus, N is 3. Therefore, in this example, the first threshold value may be set to be a value corresponding to ⅓ of the capacity of the data storage device or a value smaller than the value corresponding to ⅓ of the capacity of the data storage device, for example, ¼, ⅕, ⅙, and so on. In an example, the XLC blocks in the storage device may be QLC blocks, each of which stores 4 bits of data. Thus, N is 4. Therefore, in this example, the first threshold value may be set to be a value corresponding to ¼ of the capacity of the data storage device or a value smaller than the value corresponding to ¼ of the capacity of the data storage device, for example, ⅕, ⅙, ⅐, and so on.

Based on a combination of the afore-described possible embodiments, in an example, the XLC blocks in the storage device may be QLC blocks and the first threshold value set to be ¼ of the capacity of the storage device. Thus, in this example, after receiving the data writing command, the controller determines whether the amount of the non-idle SLC blocks in the storage block is smaller than ¼ of the capacity of the storage device; if yes, a storage block can be applied to be configured as an SLC block, the configured SLC block receiving written data according to the writing method and the storage capacity of an SLC block; if not, a storage block can be applied to be configured as a QLC block, the configured QLC block receiving written data according to the writing method and the storage capacity of a QLC block. Based on this example, when the XLC block is a block of other types, such as a MLC block, a TLC block, etc., and when the first threshold value is correspondingly set as other specific values, the process of the controller controlling the storage blocks to store data can be determined accordingly, which will not be further described herein.

In a possible embodiment, the controller is further configured for controlling the storage block to perform data transfer when the amount of idle storage blocks is smaller than a second threshold value. In a related technology, since the amount of the SLC blocks is fixed, once the SLC blocks are filled up, data transfer is required. Since data transfer greatly reduces the reading/writing speed of the storage device, the performance of the storage device is caused to reduce. It can be seen from the afore-described embodiments, the amount of the SLC blocks in the current storage device is variable. Therefore, the data transfer does not have to be performed only when the SLC block is filled up. The timing of the data transfer may be determined according to the storage distribution state of the storage block. The second threshold value is a threshold value set manually. The specific configuration can be chosen according to the actual situation of the storage device, which is not limited herein.

In a possible embodiment, controlling the storage block to perform data transfer may comprise: selecting and configuring an idle storage block as an XLC block serving as a target block; selecting a non-idle SLC block as a data source block, transferring data in the data source block to the target block; releasing the data source block, the released data source block serving as an idle storage block.

Since the SLC block has a small capacity and can only store a limited amount of data, when the amount of idle storage blocks in the storage block is smaller than the second threshold value, there is a need to transfer data in the SLC block to the XLC block. Since the XLC block can store a relatively high amount of data, a part of the storage blocks can be released to increase the amount of idle storage blocks. These released idle storage blocks may be correspondingly configured as an SLC block or an XLC block by any of the afore-described embodiments, so as to continue the data writing process in the afore-described embodiments.

The specific embodiment of data transfer may vary and is not limited. In a possible embodiment, selecting a non-idle SLC block as a data source block, transferring data in the data source block to the target block may comprise: selecting the non-idle SLC block having a smallest amount of valid data as the data source block, transferring the valid data in the data source block to the target block by GC; or selecting a non-idle SLC block having the most valid data as the target source block, transferring all data in the data source block to the target block by COPYBACK.

It can be seen from the above embodiment that the data transfer may be performed by GC (Garbage Collector) or by COPYBACK.

Figure 3:
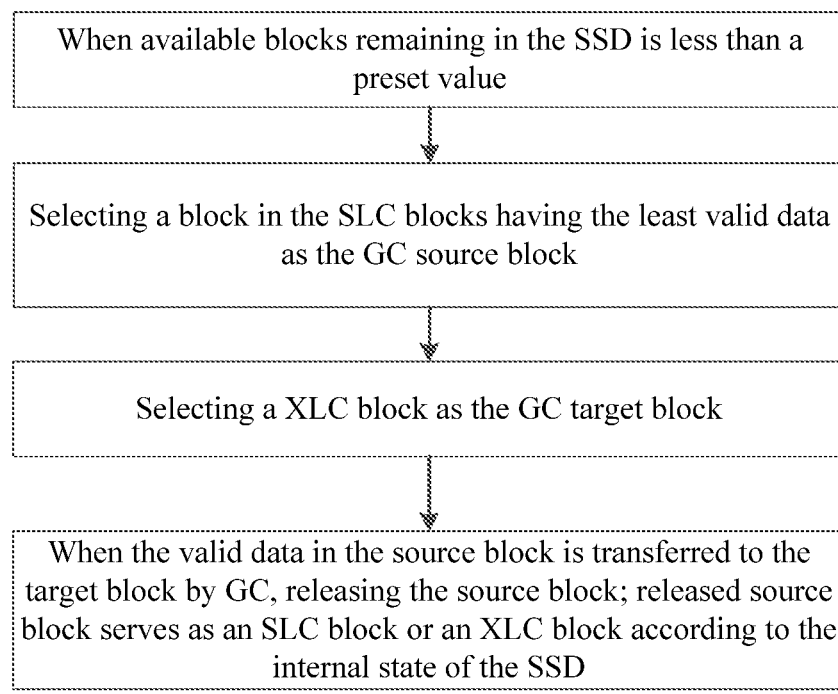
FIG. 3 is a flow chart of the data transferring process according to an embodiment of the present disclosure.

FIG. 3 is a flow chart of the data transferring process according to an embodiment of the present disclosure. As shown in FIG. 3, in an example, the process of data transfer by GC may be as below. When the capacity of the data storage device is smaller than the second threshold value, first a storage block of the non-idle SLC blocks which has the least valid data is selected as the data source block; and then an XLC block is selected as the target block. The XLC block selected as the target block may be an idle storage block configured as an XLC block or an XLC block into which data has been stored and which still has available storage space, which is not limited. When the data source block and the target block are determined, the valid data in the data source block can be moved to the target block by GC. When the data transfer is completed, data in the data source block may be released; the released data source block serves as an idle storage block and is configured as an SLC block or an XLC block according to any of the afore-described embodiment when data writing is needed. In this example, the means of transferring data by GC mainly moves the valid data in the data source block to the target block and releases the space of the non-valid data in the data source block. Therefore, before the data transfer by GC, there is a need to first determine which data in the data source block is valid. This confirmation may cost some time. Thus, the method of data transfer by GC is more suitable for a case where the data source block contains relatively few valid data, which reduces the time for determining the valid data in the data source block. Moreover, during the data transfer process, an SLC block with less valid data is preferred to be selected as the data source block to further shorten the time for data transfer, thereby improving the efficiency of the data transfer.

Figure 4:
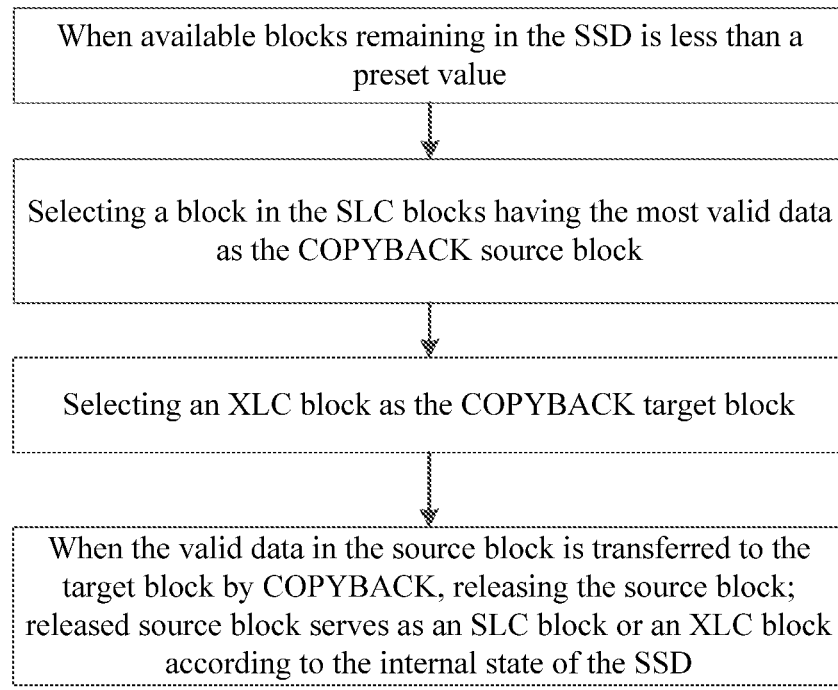
FIG. 4 is a flow chart of the data transferring process according to an embodiment of the present disclosure.

FIG. 4 is a flow chart of the data transferring process according to an embodiment of the present disclosure. As shown in FIG. 4, in an example, the process of data transfer by COPYBACK may be as below. When the capacity of the data storage device is smaller than the second threshold value, first the storage block in the non-idle SLC blocks having the most valid data is selected as the data source block; then an XLC block is selected as the target block. The XLC block selected as the target block could be an idle storage block configured as an XLC block or an XLC block in which data has been stored and which still has available storage space, which is not limited. When the data source block and the target block are selected, the valid data in the data source block is transferred to the target block by COPYBACK. After completion of the data transfer, data in the data source block may be released. The released data source block serves as an idle storage block and is correspondingly configured as an SLC block or an XLC block according to any of the afore-described embodiment when there is a need of data written. In the present example, the means of data transfer by COPYBACK is mainly moving all the data in the data source block to into the target block, including the valid data and the invalid data. Therefore, before the data transfer by COPYBACK, it is not required to determine which of the data in the data source block is valid. However, since all of the data need to be moved, the data transfer process costs more time as compared to the method by GC. Therefore, data transfer by COPYBACK is more suitable for a scenario where the data source block contains a relatively high amount of valid data. The transfer of a whole of data costs less time than determining the location of valid data; meanwhile, during the data transfer, it is preferred that an SLC block containing more valid data is selected as the data source block, which further shortens the time for data transfer, thereby further improving the efficiency of data transfer.

Thus, by dynamically adjusting the amount of SLC blocks, it is possible that the reading/writing performance of the storage device is maintained when the amount of SLC blocks in the storage device does not reach the set first threshold value. It is substantially possible that the data reading/writing performance is realized by SLC blocks. Preferably, it is even possible that all the remaining storage blocks serve as SLC blocks, which will greatly improve the reading/writing speed of the device. Meanwhile, as the amount of the SLC blocks is dynamically changeable, the data transfer may be triggered only when the amount of idle blocks is smaller than the second threshold value. Thus, the time of data transfer is delayed, which extends the time period of high reading/writing performance of the storage device, thereby further improving the maintaining of the high reading/writing performance of the storage device. The specific method of data transfer may be flexibly chosen according to the amount of valid data stored in the storage block, which further improves the speed of data transfer, thereby further extending the time period of high reading/writing performance of the storage device.

It should be noted that the data writing process is taken as an example to illustrate the working process of the data storage device in each of the above disclosed embodiments. Since data reading can be performed with the data storage device in addition to data writing, the data reading process of the data storage device can also refer to the above disclosed embodiments, which would not be repeated in detail herein.

Figure 5:
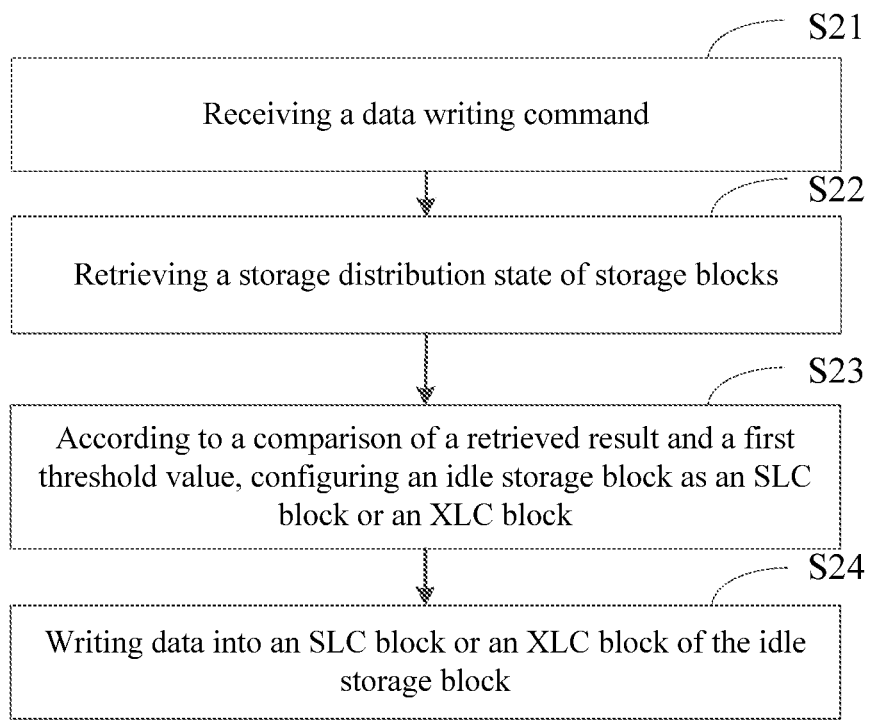
FIG. 5 is a flow chart of the data writing method according to an embodiment of the present disclosure.

FIG. 5 is a flow chart of the data writing method according to an embodiment of the present disclosure. As shown in FIG. 5, the method may comprise the following steps:

S21: receiving a data writing command;

S22: retrieving a storage distribution state of storage blocks;

S23: according to a comparison of a retrieved result and a first threshold value, configuring an idle storage block as an SLC block or an XLC block;

S24: writing data into the SLC block or the XLC block of the idle storage block.

In a possible embodiment, the step S22 may include:

selecting and configuring an idle storage block as an SLC block when an amount of the non-idle SLC block is smaller than a first threshold value;

selecting and configuring an idle storage block as an XLC block when an amount of the non-idle SLC block is not smaller than a first threshold value.

In a possible embodiment, the first threshold value is not greater than 1/N of a capacity of the data storage device, wherein N is an amount of bits of data stored in the XLC block.

Figure 6:
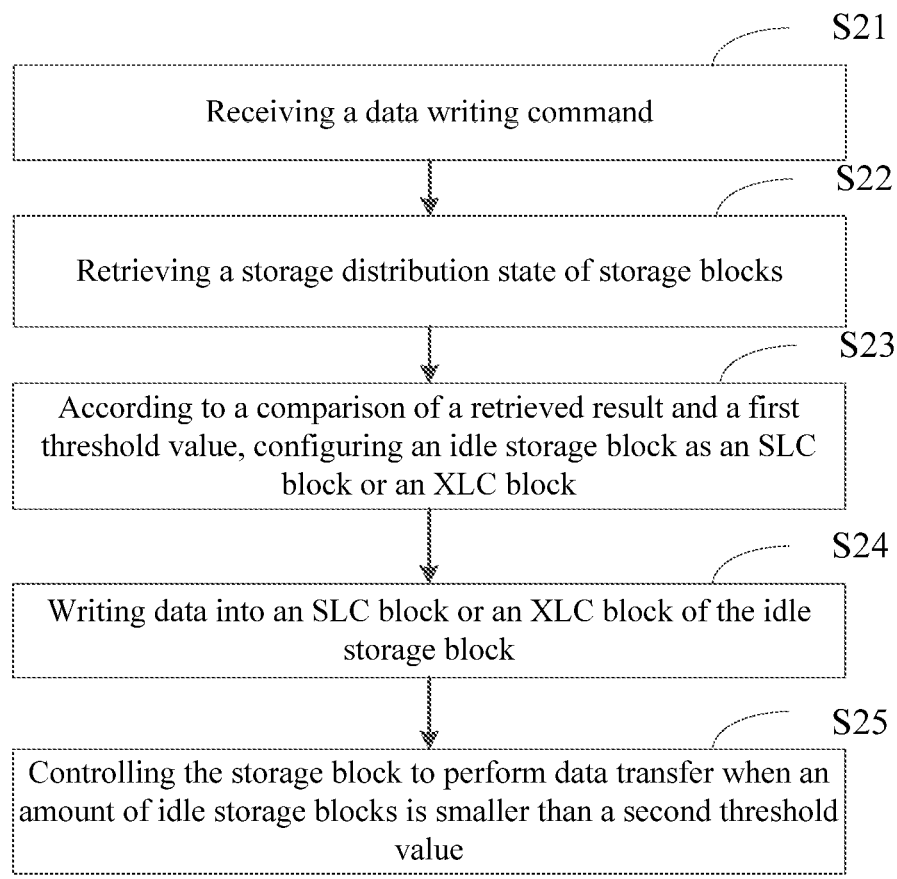
FIG. 6 is a flow chart of the data writing method according to an embodiment of the present disclosure.

FIG. 6 is a flow chart of the data writing method according to an embodiment of the present disclosure. As shown in FIG. 6, in a possible embodiment, the data writing method further comprises:

S25: controlling the storage block to perform data transfer when an amount of idle storage blocks is smaller than a second threshold value.

Figure 7:
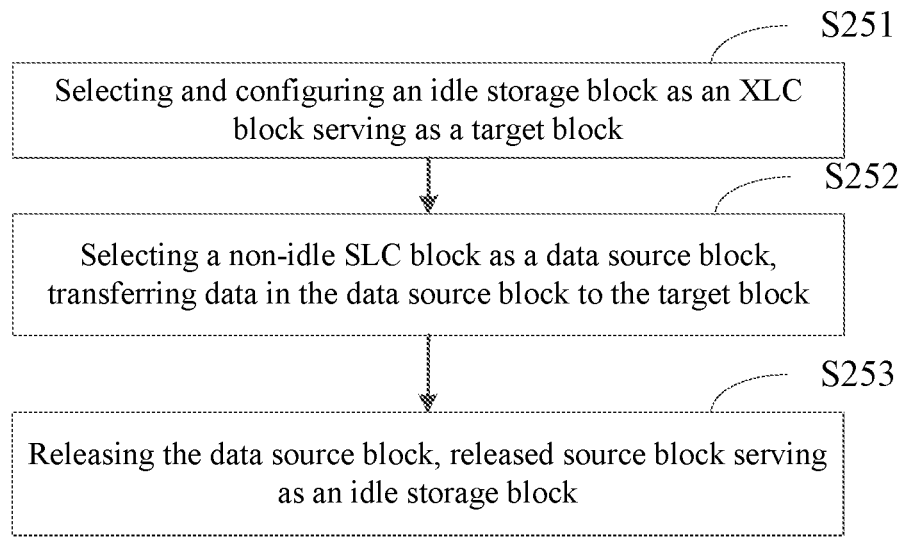
FIG. 7 is a flow chart of the data writing method according to an embodiment of the present disclosure.

FIG. 7 is a flow chart of the data writing method according to an embodiment of the present disclosure. As shown in FIG. 7, in a possible embodiment, the step S24 includes:

S251: selecting and configuring an idle storage block as an XLC block serving as a target block;

S252: selecting a non-idle SLC block as a data source block, transferring data in the data source block to the target block;

S253: releasing the data source block, released source block serving as an idle storage block.

In a possible embodiment, the step S252 includes:

selecting a non-idle SLC block having the least valid data as the data source block, transferring the valid data in the data source block to the target block by GC; or selecting a non-idle SLC block having the most valid data as the data source block, transferring all data in the data source block to the target block by COPYBACK.

Figure 8:
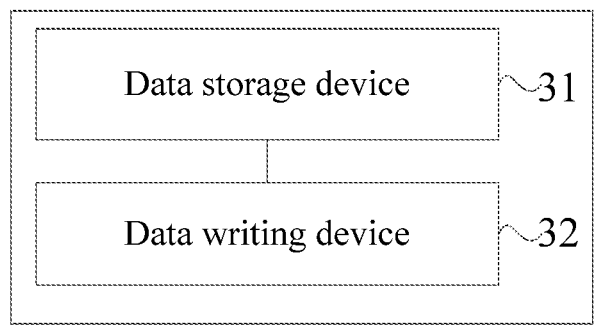
FIG. 8 is a block diagram of the data storage system according to an embodiment of the present application.

FIG. 8 is a block diagram of the data storage system according to an embodiment of the present application. As shown in FIG. 8, the storage system in the present embodiment comprises: a data storage device 31 according to any one of the afore-described embodiments and a data writing device 32 for writing data into the data storage device. The data storage device is described in detail in the examples described above, which will not be repeated herein. The embodiment of the data writing device is not limited. Any hardware means capable of writing data into a data storage device may serve as the data writing device. It may be a computer, a smartphone, a tablet computer, or an MCU (Microcontroller Unit), etc., as non-exhaustive examples. The connection between the data writing device and the data storage device is not limited and may be flexibly chosen according to the embodiments of the data writing device and that of the data storage device, as long as it allows data in the data writing device to flow to the data storage device.

The flow charts and block diagrams of the drawings show possible architectures, functions and operations realizable by the systems, methods, and computer program products according to multiple embodiments of the present disclosure. In this regard, each block in a flow chart or block diagram represents a module, a program segment, or a part of instruction. The module, program segmentation, or part of instruction includes one or more executable instructions for realizing a prescribed logical function. In some alternative embodiments, the functions marked in the blocks may occur in an order different from that shown in the drawings. For example, two consecutive blocks may be executed substantially in parallel or sometimes executed in a reversed order, according to the related function. It should be noted that, each block in the block diagrams and/or the flowcharts, and a combination of blocks in the block diagrams and/or the flowcharts may be realized by a special hardware-based system for executing a prescribed function or action or by a combination of special hardware and computer instructions.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A data storage device, comprising:
   a controller; and
   a plurality of storage blocks, each storage block being an idle storage block or a non-idle storage block;
   wherein the controller is connected to each of the plurality of storage blocks respectively, and configured to
   generate, responsive to receiving a data writing command, a self-adapting adjustment instruction according to a comparison between a storage distribution state of the plurality of storage blocks and a first threshold value, and
   configure an idle storage block of the plurality of storage blocks as an X-level cell (XLC) block for data writing when the comparison indicates that an amount of non-idle single-level cell (SLC) blocks of the plurality of storage blocks is not smaller than the first threshold value;
   wherein the storage block is configured to correspondingly adjust the storage distribution state of the plurality of storage blocks according to the self-adapting adjustment instruction to store written data in the configured XLC block of the plurality of storage blocks.

2. The data storage device according to claim 1, wherein the plurality of storage blocks includes the non-idle SLC block and the non-idle XLC block, the non-idle SLC block and the non-idle XLC block being the non-idle storage block.

3. The data storage device according to claim 2, wherein the controller is configured for
   receiving the data writing command;
   retrieving the storage distribution state; and
   comparing a retrieved result with the first threshold value.

4. The data storage device according to claim 2, wherein the controller is further configured for
   controlling the storage block to perform data transfer responsive to an amount of the idle-storage blocks being smaller than a second threshold value.

5. The data storage device according to claim 4, wherein controlling the storage block to perform data transfer comprises:
   selecting and configuring an idle storage block as an XLC block serving as a target block;
   selecting a non-idle SLC block as a data source block, transferring data in the data source block to the target block;
   releasing the data source block, released source block serving as an idle storage block.

6. The data storage device according to claim 5, wherein selecting a non-idle SLC block as a data source block, transferring data in the data source block to the target block comprises:
   selecting a non-idle SLC block having the least valid data as the data source block, transferring the valid data in the data source block to the target block by GC; or
   selecting a non-idle SLC block having the most valid data as the data source block, transferring all data in the data source block to the target block by COPYBACK.

7. The data storage device according to claim 1, wherein the first threshold value is not greater than 1/N of a capacity of the data storage device, wherein N is an amount of bits of data stored in the XLC block of the plurality of storage blocks.

8. A data writing method for a data storage device, comprising receiving a data writing command;
   retrieving a storage distribution state of a plurality of storage blocks in the data storage device, each storage blocks being an idle storage block or a non-idle storage block;
   configuring an idle storage block of the plurality of storage blocks as an X-level cell (XLC) block for data writing when a comparison between the retrieved storage distribution and a first threshold value indicates that an amount of non-idle SLC blocks of the plurality of storage blocks is not smaller than the first threshold value;
   writing data into the configured XLC block of the plurality of idle storage blocks.

9. The data writing method according to claim 8, wherein the first threshold value is not greater than 1/N of a capacity of the data storage device, wherein N is an amount of bits of data stored in the XLC block of the plurality of storage blocks.

10. The data writing method according to claim 8, further comprising:
    controlling the storage block to perform data transfer responsive to an amount of the idle storage blocks being smaller than a second threshold value.

11. The data writing method according to claim 10, wherein controlling the storage block to perform data transfer comprises:
    selecting and configuring an idle storage block as an XLC block serving as a target block;
    selecting a non-idle SLC block as a data source block, transferring data in the data source block to the target block;
    releasing the data source block, released source block serving as an idle storage block.

12. The data writing method according to claim 11, wherein selecting a non-idle SLC block as a data source block, transferring data in the data source block to the target block comprises:
    selecting a non-idle SLC block having the least valid data as the data source block, transferring the valid data in the data source block to the target block by GC; or
    selecting a non-idle SLC block having the most valid data as the data source block, transferring all data in the data source block to the target block by COPYBACK.

13. A data storage system, comprising
    a data storage device, comprising a controller and a plurality of storage blocks, each storage block being an idle storage block or a non-idle storage block, the controller connecting to each of the plurality of storage blocks respectively, wherein
    the controller is configured to
    generate, responsive to receiving a data writing command, a self-adapting adjustment instruction according to a comparison between a storage distribution state of the plurality of storage blocks and a first threshold value, and
    configure an idle storage block of the plurality of storage blocks as an X-level cell (XLC) block for data writing when the comparison indicates that an amount of non-idle single-level cell (SLC) blocks of the plurality of storage blocks is not smaller than the first threshold value;
    wherein the storage block is configured to correspondingly adjust the storage distribution state of the plurality of storage blocks according to the self-adapting adjustment instruction to store written data in the configured XLC block of the plurality of storage blocks;

a data writing device for writing data into the data storage device.

14. The data storage system according to claim 13, wherein the plurality of storage blocks includes the non-idle SLC block and the non-idle XLC block, the non-idle SLC block and the non-idle XLC block being the non-idle storage block.

15. The data storage system according to claim 14, wherein the controller is further configured for
controlling the storage block to perform data transfer responsive to an amount of the idle-storage blocks being smaller than a second threshold value.

16. The data storage system according to claim 15, wherein controlling the storage block to perform data transfer comprises:
selecting and configuring an idle storage block as an XLC block serving as a target block;
selecting a non-idle SLC block as a data source block, transferring data in the data source block to the target block;
releasing the data source block, released source block serving as an idle storage block.

17. The data storage system according to claim 16, wherein selecting a non-idle SLC block as a data source block, transferring data in the data source block to the target block comprises:
selecting a non-idle SLC block having the least valid data as the data source block, transferring the valid data in the data source block to the target block by GC; or
selecting a non-idle SLC block having the most valid data as the data source block, transferring all data in the data source block to the target block by COPYBACK.

18. The data storage system according to claim 13, wherein the controller is configured for
receiving the data writing command;
retrieving the storage distribution state; and
comparing a retrieved result with the first threshold value.

19. The data storage system according to claim 13, wherein the first threshold value is not greater than 1/N of a capacity of the data storage device, wherein N is an amount of bits of data stored in the XLC block of the plurality of storage blocks.

* * * * *